United States Patent
Saggar et al.

(10) Patent No.: US 11,510,087 B2
(45) Date of Patent: Nov. 22, 2022

(54) DIFFERENTIAL MEASUREMENT REPORTING BASED ON A DEMODULATION REFERENCE SIGNAL

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 17/092,014

(22) Filed: Nov. 6, 2020

(65) Prior Publication Data

US 2022/0150737 A1  May 12, 2022

(51) Int. Cl.
*H04W 24/10* (2009.01)
*H04L 5/00* (2006.01)
*H04W 16/28* (2009.01)

(52) U.S. Cl.
CPC .......... *H04W 24/10* (2013.01); *H04L 5/0051* (2013.01); *H04W 16/28* (2013.01)

(58) Field of Classification Search
CPC ...... H04W 24/10; H04W 16/28; H04L 5/0051
See application file for complete search history.

(56) References Cited

U.S. PATENT DOCUMENTS

| | | | |
|---|---|---|---|
| 10,880,895 B2 * | 12/2020 | Gordaychik | H04L 1/1896 |
| 2019/0159178 A1 * | 5/2019 | Tang | H04L 27/2602 |
| 2020/0021470 A1 * | 1/2020 | Sun | H04L 5/0051 |
| 2020/0228297 A1 | 7/2020 | Zhang et al. | |
| 2022/0123896 A1 * | 4/2022 | Taherzadeh Boroujeni | H04L 5/0055 |

FOREIGN PATENT DOCUMENTS

| | | | | |
|---|---|---|---|---|
| EP | 3913834 A1 * | 11/2021 | | H04L 1/1812 |
| WO | WO-2021029759 A1 * | 2/2021 | | |
| WO | WO-2021188893 A1 * | 9/2021 | | |

OTHER PUBLICATIONS

Iyab Sakhnini et al., U.S. Appl. No. 62/975,597, filed Feb. 12, 2020.
Iyab Sakhnini et al., U.S. Appl. No. 62/985,821, filed Mar. 5, 2020.
Iyab Sakhnini et al., U.S. Appl. No. 63/198,007, filed Sep. 23, 2020.

(Continued)

*Primary Examiner* — Deepa Belur
(74) *Attorney, Agent, or Firm* — Norton Rose Fulbright US LLP

(57) ABSTRACT

A method of wireless communication includes receiving, by a user equipment (UE), a first transmission and transmitting, by the UE, a first measurement report that is based on the first transmission and includes at least a first measurement result. The method further includes receiving, by the UE, a second transmission that includes a demodulation reference signal (DMRS) and further includes transmitting, by the UE, a second measurement report that is based on the DMRS. The second measurement report includes at least a first value that is based on a difference between the first measurement result and a second measurement result that is based on the DMRS.

30 Claims, 9 Drawing Sheets

(56) References Cited

OTHER PUBLICATIONS

International Search Report and Written Opinion—PCT/US2021/072205—ISA/EPO—dated Mar. 7, 2022.
NEC: "Differential L1-RSRP Reporting", 3GPP Draft, 3GPP TSG RAN WG1 Meeting #90, R1-1712997 Differential L1-RSRP reporting, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017 Aug. 20, 2017 (Aug. 20, 2017), XP051315806, pp. 1-5, Retrieved from the Internet: URL: http://www.3gpp.org/ftp/Meetings_3GPP_SYNC/RAN1/Docs/ [retrieved on Aug. 20, 2017].

* cited by examiner

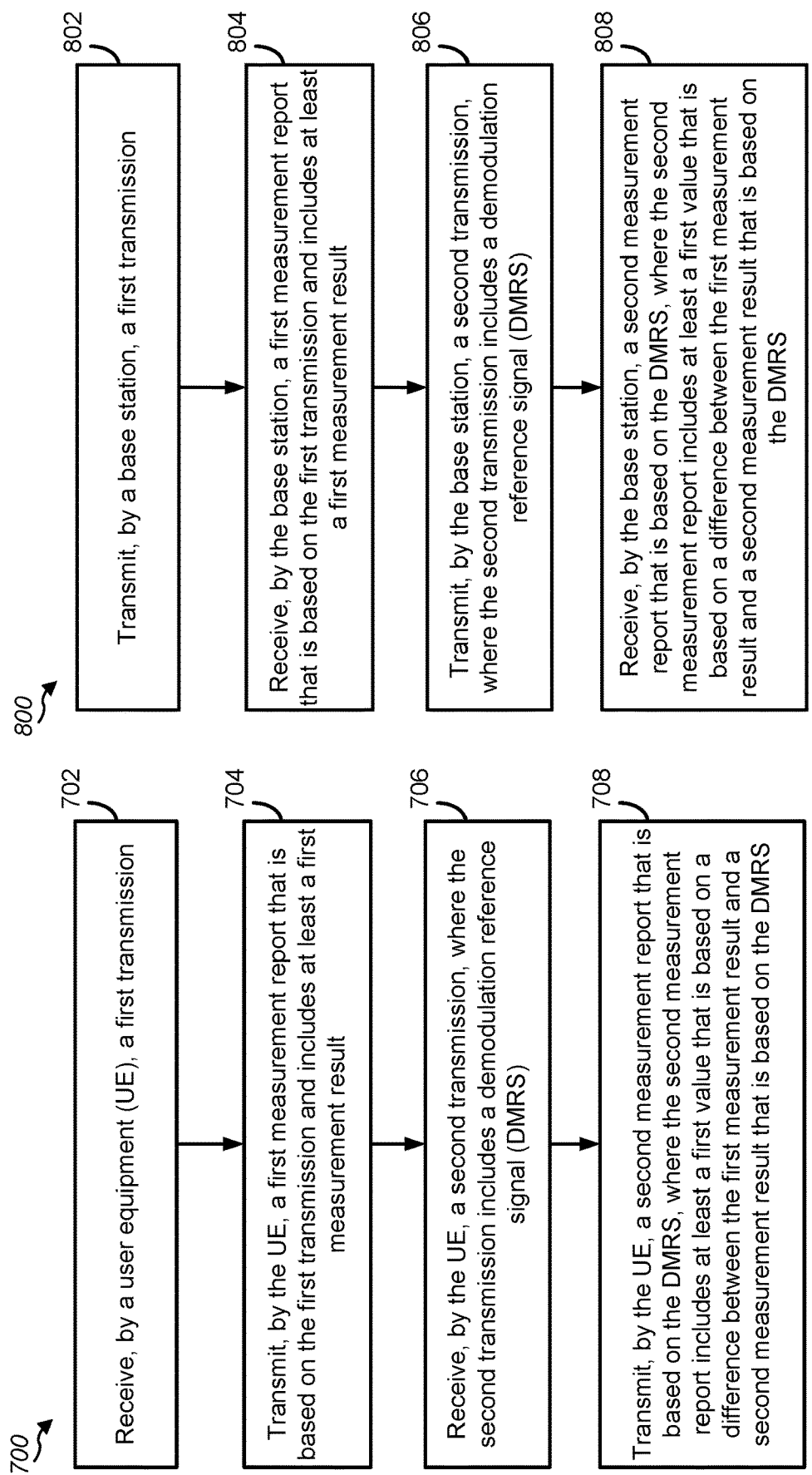

DIFFERENTIAL MEASUREMENT REPORTING BASED ON A DEMODULATION REFERENCE SIGNAL

TECHNICAL FIELD

Aspects of the present disclosure relate generally to wireless communication systems, and more particularly, to wireless communication systems that perform measurement reporting.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication includes receiving, by a user equipment (UE), a first transmission and transmitting, by the UE, a first measurement report that is based on the first transmission and includes at least a first measurement result. The method further includes receiving, by the UE, a second transmission that includes a demodulation reference signal (DMRS) and further includes transmitting, by the UE, a second measurement report that is based on the DMRS. The second measurement report includes at least a first value that is based on a difference between the first measurement result and a second measurement result that is based on the DMRS.

In some other aspects of the disclosure, an apparatus for wireless communication includes a receiver configured to receive a first transmission and to receive a second transmission that includes a DMRS. The apparatus further includes a transmitter configured to transmit a first measurement report that is based on the first transmission and that includes at least a first measurement result and to transmit a second measurement report that is based on the DMRS. The second measurement report includes at least a first value that is based on a difference between the first measurement result and a second measurement result that is based on the DMRS.

In some other aspects of the disclosure, a method of wireless communication includes transmitting, by a base station, a first transmission and receiving, by the base station, a first measurement report that is based on the first transmission and includes at least a first measurement result. The method further includes transmitting, by the base station, a second transmission that includes a DMRS and receiving, by the base station, a second measurement report that is based on the DMRS. The second measurement report includes at least a first value that is based on a difference between the first measurement result and a second measurement result that is based on the DMRS.

In some other examples, an apparatus for wireless communication includes a transmitter configured to transmit a first transmission and to transmit a second transmission that includes a DMRS. The apparatus further includes a receiver configured to receive a first measurement report that is based on the first transmission and includes at least a first measurement result and to receive a second measurement report that is based on the DMRS. The second measurement report includes at least a first value that is based on a difference between the first measurement result and a second measurement result that is based on the DMRS.

BRIEF DESCRIPTION OF THE DRAWINGS

FIG. 7 is a flow chart illustrating an example of a method of wireless communication according to some aspects of the disclosure.

FIG. 8 is a flow chart illustrating an example of a method of wireless communication according to some aspects of the disclosure.

DETAILED DESCRIPTION

Figure 1:
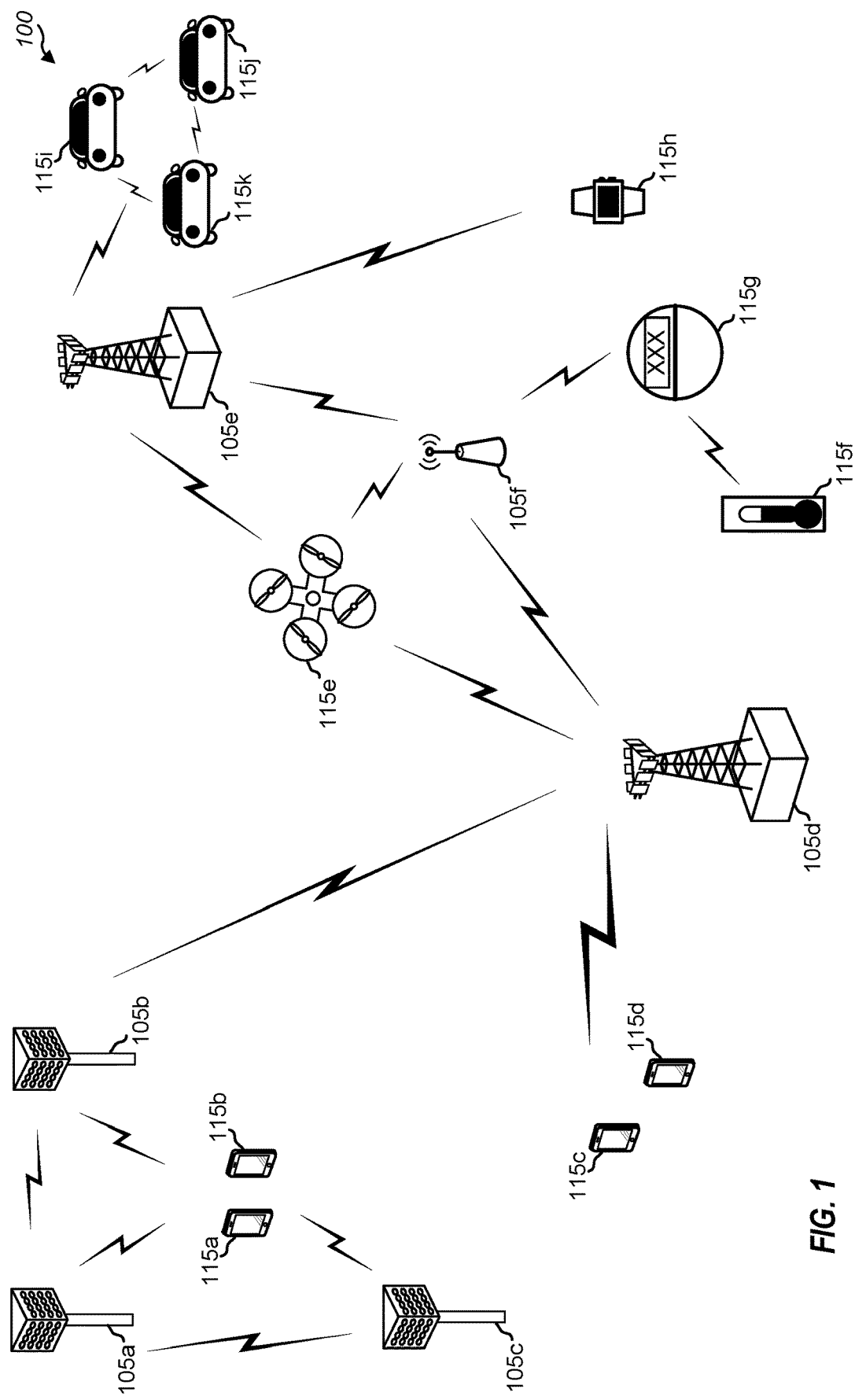
FIG. 1 is a block diagram illustrating an example of a wireless communication system according to some aspects of the disclosure.

Wireless communications systems increasingly provide premium services and other features. For example, cellular phones may provide broadband communications, low latency, high reliability, high throughput, and other services. As a result, wireless communication systems include features such as embedded mobile broadband (eMBB), ultra-reliable low-latency communication (URLLC), and vehicle-to-everything (V2X) communications.

In some applications, such features may increase overhead and complexity, which may decrease certain performance parameters or cost-efficiency. For example, some "low-overhead" devices (such as a stationary sensor or a stationary camera) may occasionally transmit a relatively small amount of data to a network device. If the network device supports low latency, high reliability, and high throughput, then power consumption of the devices may be increased, which may reduce battery life or increase operation complexity of the metering devices in some cases.

A wireless communication system in accordance with some aspects of the disclosure may use differential measurement reporting to reduce an amount of data transmitted in the wireless communication system. To illustrate, a user equipment (UE) may perform measurements based on a demodulation reference signal (DMRS) that may have a quasi-colocation (QCL) relation with a prior signal, such as a synchronization signal block (SSB) or a channel state information reference signal (CSI-RS). The UE may indicate the measurements to a base station in a differential format, such as by indicating values that correspond to a difference between the measurements and other measurements of a prior measurement report transmitted based on the prior signal. In such examples, the values may be referred to as being reported on a time-differential or inter-report basis. Alternatively or in addition, measurements may be reported on an intra-report basis. In such examples, a value of a measurement report may correspond to a difference between multiple measurements associated with the measurement report.

By using a differential format to report measurements, an amount of data transmitted via a wireless communication system may be reduced, which may be advantageous in some applications, such as low-overhead wireless communication protocols. To illustrate, in some wireless communication protocols, measurements may be reported using a relatively large number of bits or digits, and the measurements may change relatively infrequently (such as in the case of stationary sensors in a building, as an illustrative example). Further, in some cases, a DMRS may serve multiple purposes in a wireless communication system, which may reduce a number of reference signals or a number of resources associated with reference signals in the wireless communication system. For example, in addition to using a DMRS to estimate channel characteristics and demodulate signals received from a base station, a UE may report measurements based on the DMRS. As a result, one or more of a periodicity of a CSI-RS or an SSB or a number of resources used to transmit the CSI-RS or the SSB may be reduced, increasing bandwidth or resources available for other communications, for other devices, or both.

To further illustrate, certain aspects of the disclosure may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
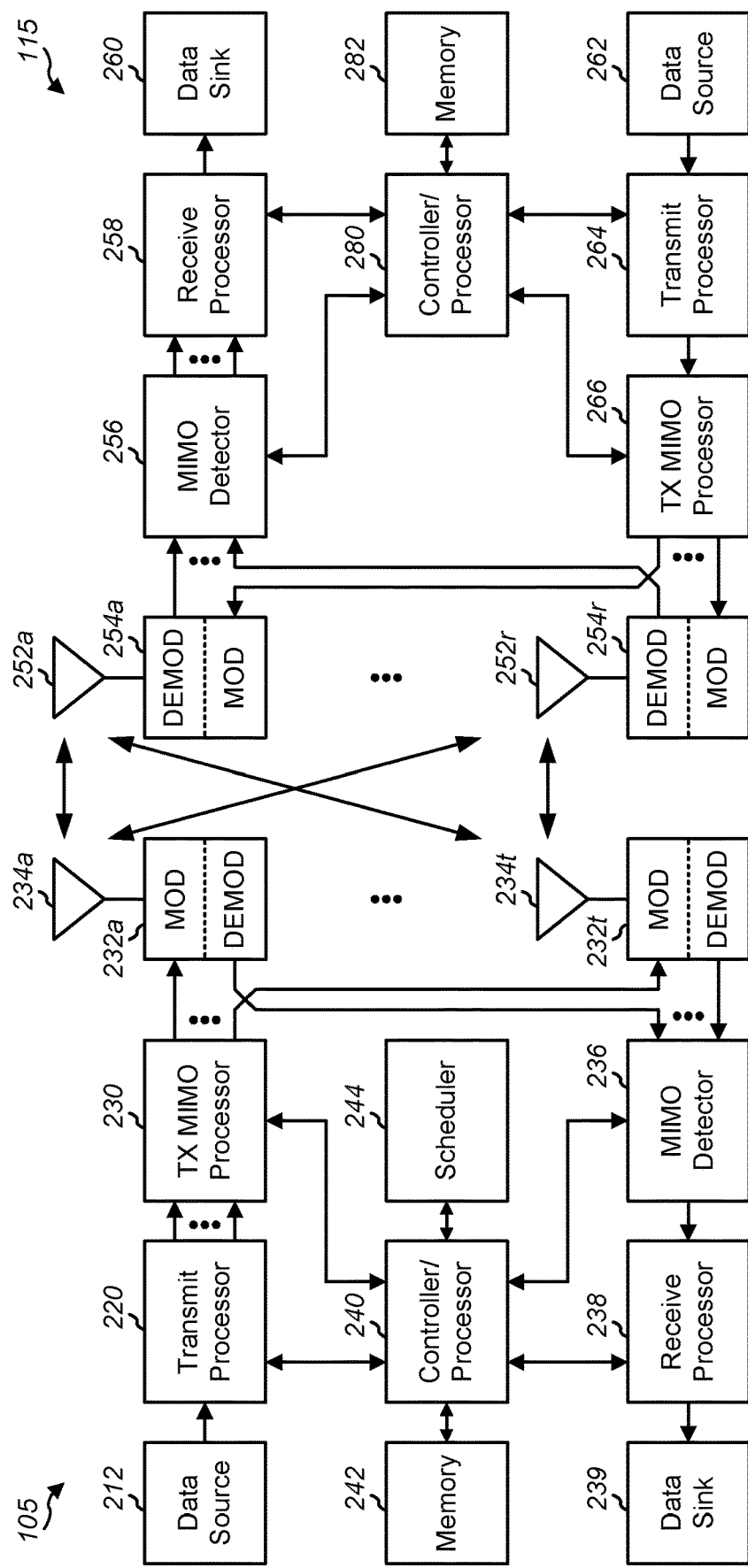
FIG. 2 is a block diagram illustrating examples of a base station and a UE according to some aspects of the disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 7 and 8 and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5g network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
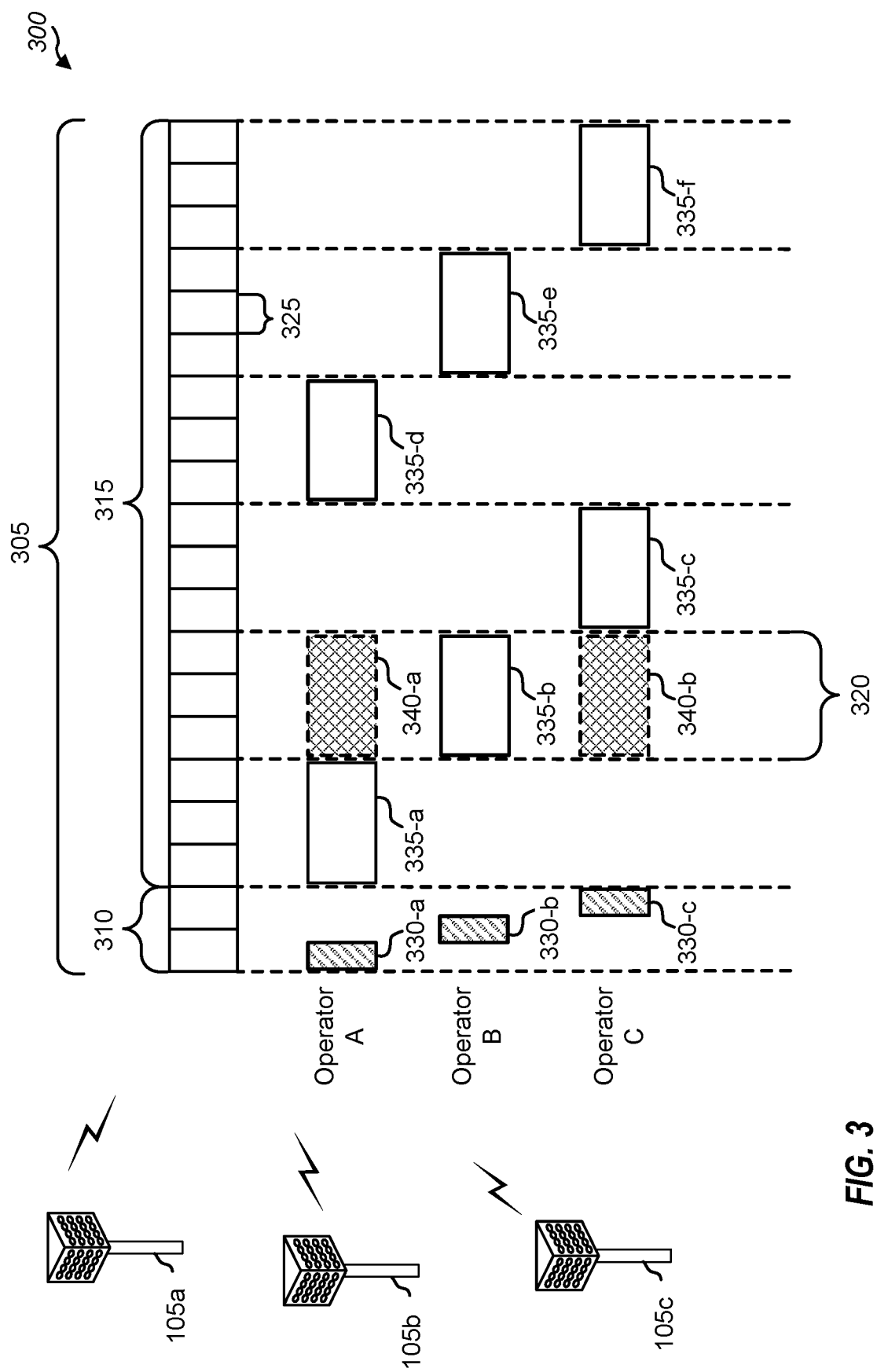
FIG. 3 is a block diagram illustrating an example of a wireless communication system including base stations that use directional wireless beams according to some aspects of the disclosure.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
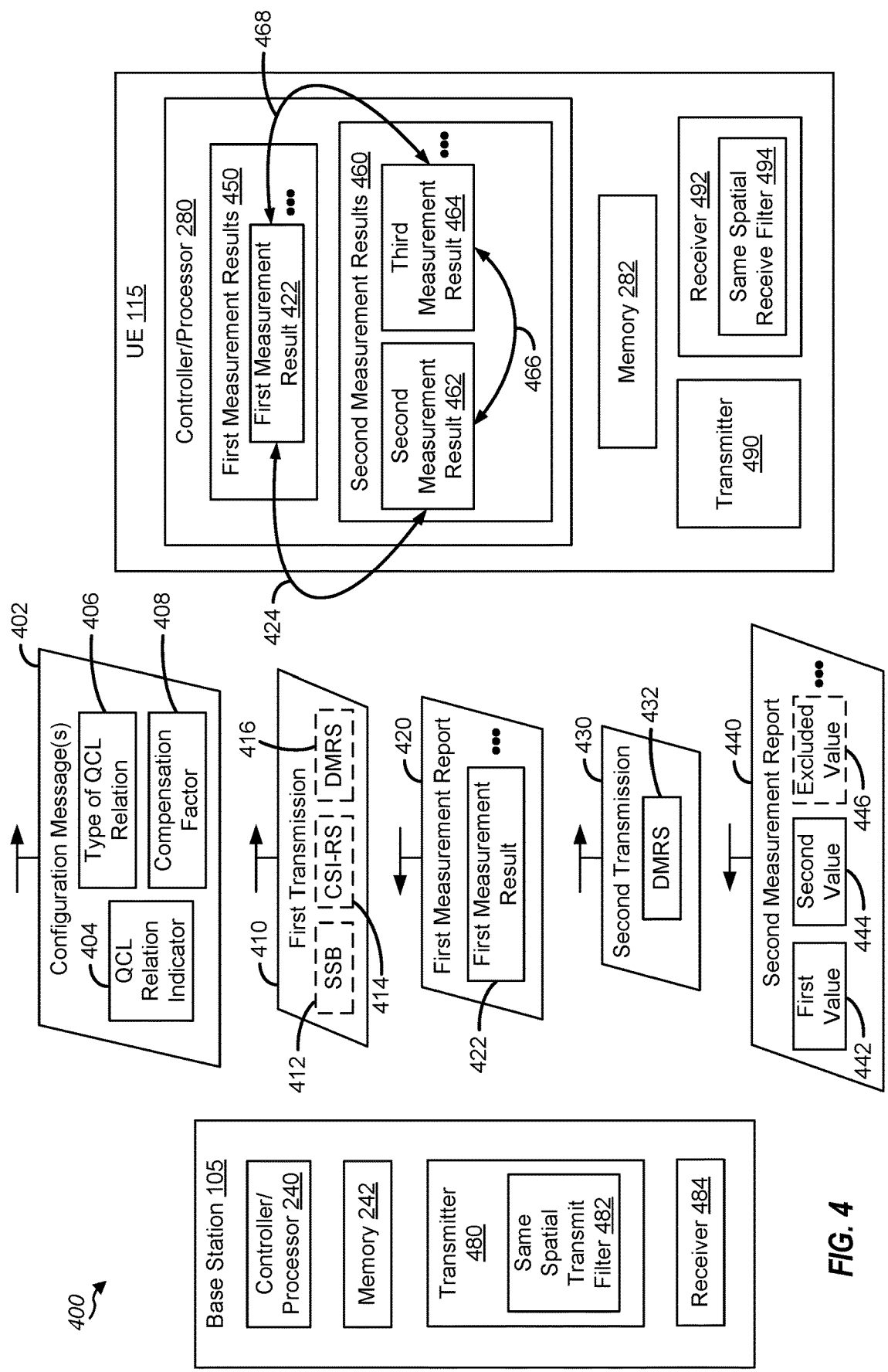
FIG. 4 is a block diagram illustrating an example of a wireless communication system according to some aspects of the disclosure.

FIG. 4 is a block diagram illustrating an example of a wireless communication system 400 according to some aspects of the disclosure. The wireless communication system 400 may include one or more base stations, such as the base station 105, and may include one or more UEs, such as the UE 115.

The base station 105 may include one or more processors (such as the controller/processor 240), one or more memories (such as the memory 242), a transmitter 480, and a receiver 484. The transmitter 480 and the receiver 484 may include one or more components or devices described herein, such as the modulator/demodulators 232a-t, the MIMO detector 236, the receive processor 238, the transmit processor 220, the TX MIMO processor 230, one or more other components or devices, or a combination thereof.

The UE 115 may include one or more processors (such as the controller/processor 280), one or more memories (such as the memory 282), a transmitter 490, and a receiver 492. The transmitter 490 and the receiver 492 may include one or more components or devices described herein, such as the modulator/demodulators 254a-r, the MIMO detector 256, the receive processor 258, the transmit processor 264, the TX MIMO processor 266, one or more other components or devices, or a combination thereof.

In some aspects, the wireless communications system 400 includes or corresponds to a low power wide area (LPWA) network. For example, the wireless communications system 400 may correspond to a reduced capability (RedCap) network that includes one or more UEs 115 having performance parameters (such as peak throughput, latency, and reliability) that are less than (or "relaxed") as compared to performance parameters of other devices, such as a device that supports eMBB or URLLC features. To further illustrate, in some examples, the UE 115 corresponds to "light" or "superlight" device that uses low-power or low-complexity operations as compared to a device that supports eMBB or URLLC features.

During operation, the UE 115 may perform measurements and may report the measurements to the base station 105. To illustrate, the base station 105 may perform a first transmission 410. Depending on the particular example, the first transmission 410 may include a synchronization signal block (SSB) 412, a channel state information reference signal (CSI-RS) 414, or a demodulation reference signal (DMRS) 416, one or more other signals, or a combination thereof. The UE 115 may perform measurements based on the first transmission 410 to generate first measurement results 450. To illustrate, the base station 105 may transmit the first transmission 410 using a set of beams, and the UE 115 may perform a beam sweeping operation to measure one or more parameters (such as a signal-to-interference-plus-noise ratio (SINR) or a received signal strength indicator (RSSI)) for each beam of the set of beams. The first measurement results 450 may include the measured parameters, and the UE 115 may report the measured parameters to the base station 105 using a first measurement report 420 that is based on the first transmission 410.

After the first transmission 410, the base station 105 may perform a second transmission 430 that includes a DMRS 432. The UE 115 may perform measurements based on the second transmission 430 to generate second measurement results 460. In some examples, the UE 115 may perform one or more operations described with reference to the first measurement results 450 and the first transmission 410 to generate the second measurement results 460. For example, the base station 105 may transmit the second transmission 430 using the same set of beams described with reference to the first transmission 410. The UE 115 may perform a beam sweeping operation to measure one or more parameters (such as an SINR or an RSSI) for each beam of the set of beams. The second measurement results 460 may include the measured parameters, and the UE 115 may report the measured parameters to the base station 105 using a second measurement report 440 that is based on the DMRS 432.

In some aspects of the disclosure, the second measurement report 440 includes one or more values that are differential with respect to one or more values of the first measurement report 420. To illustrate, the first measurement report 420 may indicate a first measurement result 422 of the first measurement results 450, and the second measurement report 440 may include a first value 442 that corresponds to or that is based on a difference 424 between the first measurement result 422 and a second measurement result 462 of the second measurement results 460. The first value 442 may include fewer bits than the second measurement result 462, such as if the second measurement result 462 is similar to or the same as the first measurement result 422 (e.g., where channel conditions associated with the wireless communication system 400 are relatively invariant). In such examples, a data size of the second measurement report 440 may be reduced as compared to some other examples in which the second transmission 430 includes an explicit indication of the second measurement result 462.

The first value 442 may be referred to as a time-differential value or as an inter-report differential value. Alternatively or in addition, one or more values of the second measurement report 440 may be indicated on an intra-report differential basis. To illustrate, the second measurement report 440 may further include a second value 444 that corresponds to or is based on a difference 466 between the second measurement result 462 and a third measurement result 464 of the second measurement results 460. In such examples, the second measurement report 440 may indicate the third measurement result 464 on intra-report differential basis (because the second value 444 may correspond to or may be based on the difference 466 between the measurement results 462, 464 of the second measurement results 460). Further, in such examples, the second measurement report 440 may include at least one value that is indicated on an inter-report basis (such as the first value 442) and may include at least one other value that is indicated on an intra-report basis (such as the second value 444).

In some other examples, one or more other values of the second measurement report 440 (in addition to the first value 442) may be indicated on an inter-report basis. For example, in some implementations, the second value 444 may correspond to or may be based on a difference 468 between the first measurement result 422 and the third measurement result 464. In some examples, each value of the second measurement report 440 may be indicated on an inter-report basis (e.g., with respect to the first measurement report 420).

One or more aspects described herein may be configured by the base station 105, by one or more other network devices, or a combination thereof. To illustrate, the base station 105 may transmit to the UE 115 one or more configuration messages 402 associated with DMRS-based measurement reporting. In some examples, the one or more configuration messages 402 have a radio resource control (RRC) format.

FIG. 4 illustrates that the one or more configuration messages 402 may include a quasi-colocation (QCL) indicator 404 that indicates that the first transmission 410 has a QCL relation with the second transmission 430. In some examples, the QCL relation indicates that the first transmission 410 and the second transmission 430 have one or more common properties, such as one or more of a common transmit beam, a common Doppler shift, a common Doppler spread, a common average delay, a common average delay spread, or a common spatial receive parameter, as illustrative examples. In some examples, the QCL indicator 404 includes or corresponds to a flag in a transmission configuration indicator (TCI) state indicated by the one or more configuration messages 402.

In some examples, the QCL indicator 404 indicates that the first transmission 410 and the second transmission 430 are associated with a same spatial transmit filter 482. The base station 105 may use the same spatial transmit filter 482 to perform the first transmission 410 and the second transmission 430. Further, in some examples, the one or more configuration messages 402 may indicate a type 406 of the QCL relation between the first transmission 410 and the second transmission 430. As an example, the type 406 may correspond to one of multiple types specified by a wireless communication protocol, such as one of QCL-type A, QCL-type B, QCL-type C, or QCL-type D specified by a 5G NR wireless communication protocol.

In some examples, the UE 115 selects a spatial receive filter 494 based on the one or more configuration messages 402. As examples, the one or more configuration messages 402 may indicate a same spatial receive filter 494 to be used by the UE 115 to receive the first transmission 410 and the second transmission 430, or the UE 115 may determine the same spatial receive filter 494 based on the type 406 of the QCL relation between the first transmission 410 and the second transmission 430. The UE 115 may receive the first transmission 410 and the second transmission 430 using the same spatial receive filter 494.

In some other examples, the first transmission 410 and the second transmission 430 may have a non-QCL relation, are associated with differential spatial filters, or both. To illustrate, the one or more configuration messages 402 may request that the UE 115 provide the second measurement report 440 based on a differential format irrespective of whether the first transmission 410 has a QCL relation with the second transmission 430 and irrespective of whether the first transmission 410 and the second transmission 430 are associated with a same spatial transmit filter.

In some examples, the one or more configuration messages 402 indicate a compensation factor 408 associated with DMRS-based measurement reporting. To illustrate, in some cases, although the first transmission 410 has a QCL relation with the second transmission 430, one or more characteristics of the first transmission 410 may differ with respect to the second transmission 430. The compensation factor 408 may be selected (e.g., by the base station 105) to account for the one or more characteristics. As illustrative examples, the one or more characteristics may include one or more of a change in beam pattern from the first transmission 410 to the second transmission 430, a difference in precoding between the first transmission 410 and the second transmission 430, a change in channel condition from the first transmission 410 to the second transmission 430, or a change in scheduled bandwidth from the first transmission 410 to the second transmission 430.

To compensate for the one or more characteristics, the UE 115 may apply the compensation factor 408 to one or more measurement results of the second measurement results 460 that are differential with respect to the first measurement report 420. To illustrate, applying the compensation factor 408 to the one or more measurement results may include applying the compensation factor 408 to the second measurement result 462 (e.g., by adding, subtracting, multiplying, or dividing the second measurement result 462 and the compensation factor 408) to determine an adjusted value. The UE 115 may subtract the adjusted value from the first measurement result 422 to determine the first value 442. In such examples, the UE 115 may "pre-compensate" the second measurement results 460 prior to determining values of the second measurement report 440 that represent the second measurement results 460. In some other examples, alternatively or in addition to indicating the compensation factor 408 to the UE 115, the base station 105 may apply the compensation factor 408 (or another compensation factor) to measurement reports received from the UE 115, such as the second measurement report 440.

Alternatively or in addition to receiving an indication of the compensation factor 408 from the base station 105, the UE 115 may determine a compensation factor using one or more other techniques. In some examples, the UE 115 applies a default compensation factor to the second measurement results 460, such as a default compensation factor that is specified by a wireless communication protocol used by the base station 105 and the UE 115. In some examples, the compensation factor 408 may correspond to an update to the default compensation factor that is to be applied to one or more subsequent DMRS-based measurement reports generated by the UE 115.

In some implementations, the UE 115 may indicate one or more parameters or values by excluding a value from the second measurement report 440. To illustrate, the UE 115 may determine that a change in a particular measurement result associated with the second measurement report 440 relative to a corresponding measurement result of the first measurement report 420 fails to satisfy a threshold difference, and the UE 115 may exclude a value 446 associated with the particular measurement result from the second measurement report 440 to indicate that the change fails to satisfy the threshold difference. In some examples, a DMRS resource indicator (DMRS-RI) corresponding to the value 446 is excluded from the second measurement report 440, which may enable the base station 105 to detect exclusion of the value 446 from the second measurement report 440. The second measurement report 440 may include DMRS-RIs associated with other values included in the second measurement report 440, such as a first DMRS-RI associated with the first value 442 and a second DMRS-RI associated with the second value 444. In some examples, the first DMRS-RI indicates a beam associated with the first value 442, and the second DMRS-RI indicates a beam associated with the second value 444.

The base station 105 may determine, based on the exclusion of the DMRS-RI corresponding to the value 446, that the change fails to satisfy the threshold difference. In such examples, by excluding the value 446 from the second measurement report 440, a data size of the second measurement report 440 may be reduced as compared to an example in which the second measurement report 440 includes the value 446. It is noted that the change may be quantized to within a particular number of significant values (e.g., significant bits or significant digits) associated with the first measurement report 420 and the second measurement report 440.

In some cases, the base station 105 may change a reporting format of DMRS-based measurement reports transmitted by the UE 115 (such as the second measurement report 440). For example, a message of the one or more configuration messages 402 may change the format of the DMRS-based measurement reports transmitted by the UE. As an example, the message may indicate that the DMRS-based measurement reports are to be differential with respect to a third transmission from the base station 105 instead of with respect to the first transmission 410. As an illustrative example, the first transmission 410 may include one of the SSB 412, the CSI-RS 414, or the DMRS 416, and the third transmission may include another of the SSB 412, the CSI-RS 414, or the DMRS 416. In some other examples, the message may indicate that the DMRS-based measurement reports are to include absolute values instead of differential values, such as the measurement results 462, 464 instead of the values 442, 444.

One or more aspects of the disclosure may be used in connection with a single antenna port configuration, a multiple antenna port configuration, or a combination thereof. In some examples, the base station 105 performs the first transmission 410 using a single antenna port and performs the second transmission 430 using multiple antenna ports. The UE 115 may determine the second measurement result 462 based on an average of measurements determined over the multiple antenna ports. In such examples, the first value 442 is determined based on an average of measurements determined over multiple antenna ports. In some other examples, the base station 105 performs the first transmission 410 using a first group of antenna ports and performs the second transmission 430 using a second group of antenna ports. In such examples, the UE 115 may determine the first measurement result 422 based on a first average of measurements determined over the first group of antenna ports and may determine the second measurement result 462 based on a second average of measurements determined over the second group of antenna ports. In such examples, the first value 442 may be based on multiple averages of measurements, where each average is determined over multiple antenna ports.

Figure 5:
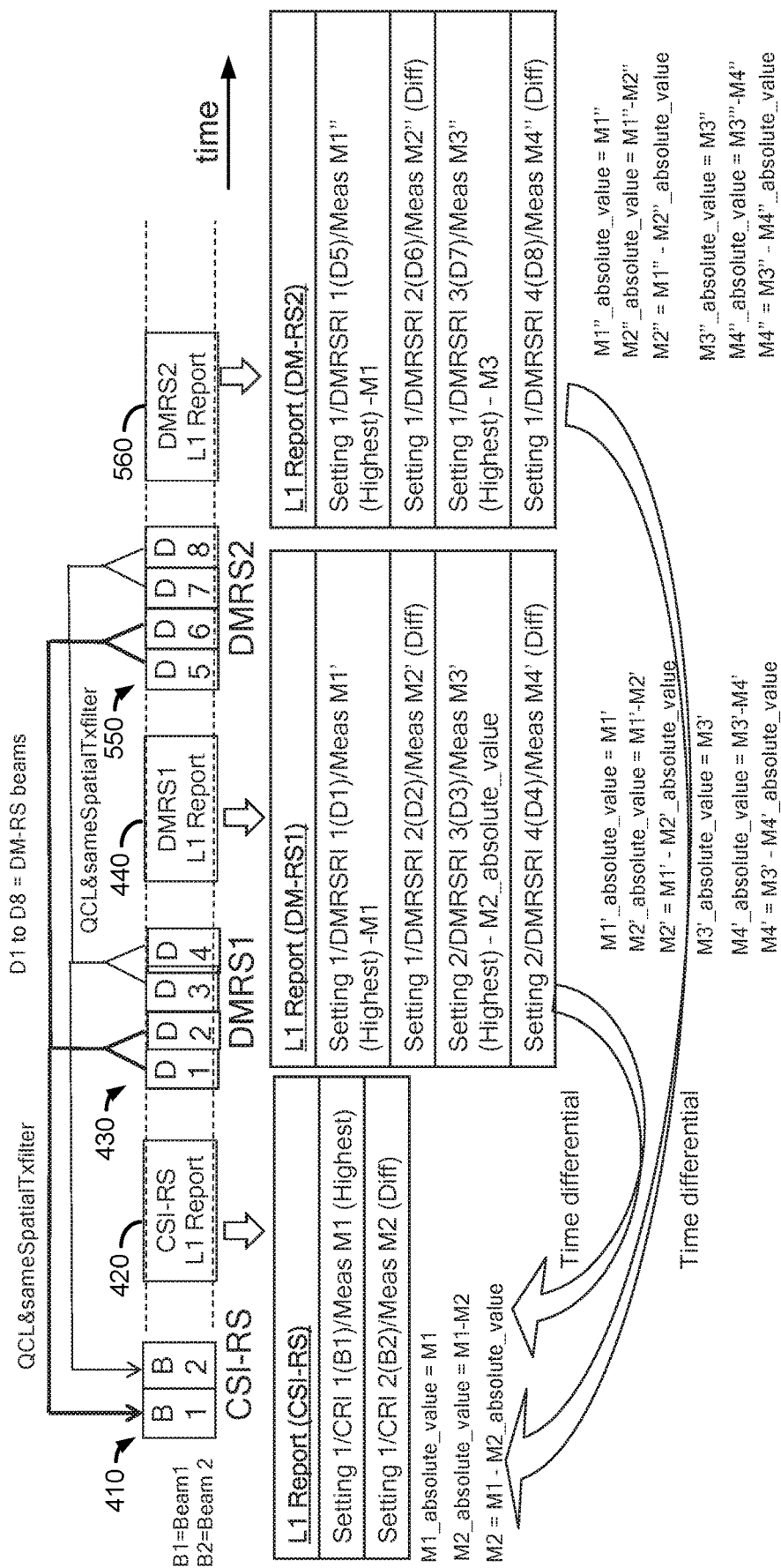
FIG. 5 is a diagram illustrating an example of inter-report and intra-report differential measurement reporting according to some aspects of the disclosure.

FIG. 5 is a diagram illustrating an example of inter-report and intra-report differential measurement reporting according to some aspects of the disclosure. In the example of FIG. 5, the first transmission 410 is performed using two beams (B1 and B2), the second transmission 430 is performed using four beams (D1, D2, D3, and D4), and a third transmission 550 is performed using four beams (D5, D6, D7, and D8). In some examples, the first transmission 410 includes the SSB 412 transmitted using the beams B1 and B2, and the second transmission 430 includes a first DMRS ("DMRS1") (e.g., the DMRS 432) transmitted using the beams D1, D2, D3, and D4, and the third transmission 550 includes a second DMRS ("DMRS2") transmitted using the beams D5, D6, D7, and D8. The UE 115 may transmit the second measurement report 440 based on DMRS1 and may transmit a third measurement report 560 based on DMRS2. Other examples are also within the scope of the disclosure.

In FIG. 5, the second measurement report 440 includes one or more values that are time differential with respect to the first measurement report 420. For example, the first measurement report 420 may include a measurement M1, and the second measurement report 440 may include a value (M1'−M1) corresponding to a difference between the measurement M1 and a measurement M1' that is based on DMRS1.

FIG. 5 also illustrates that the second measurement report 440 may include one or more values that are differential with respect to the value (M1'−M1). For example, the second measurement report may further include a value (M2') corresponding to a difference between the measurement M1' and a measurement M2' that is based on DMRS1.

Figure 6:
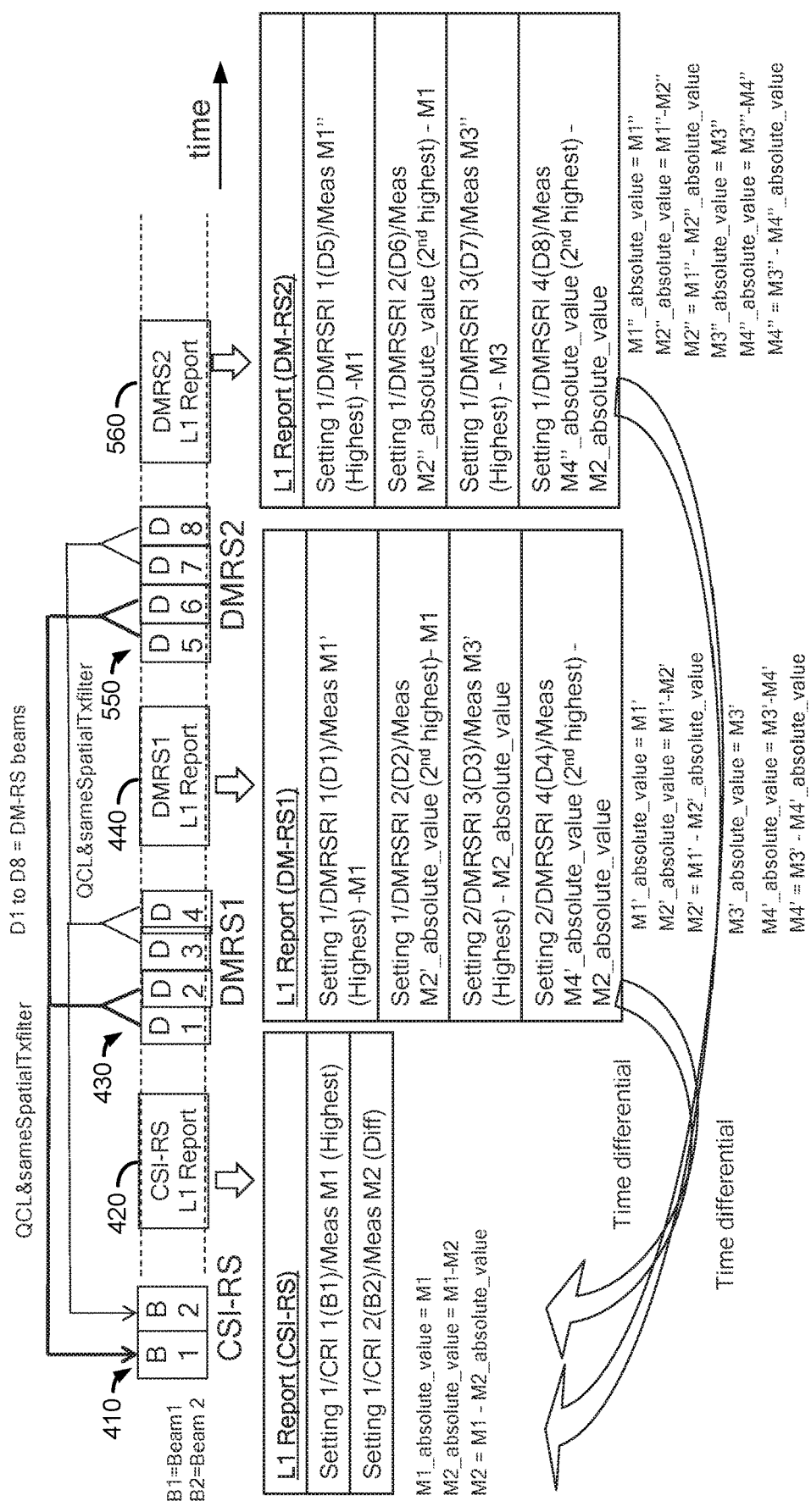
FIG. 6 is a diagram illustrating an example of inter-report differential measurement reporting according to some aspects of the disclosure.

FIG. 6 is a diagram illustrating an example of inter-report differential measurement reporting according to some aspects of the disclosure. In FIG. 5, the second measurement report 440 includes values that are time differential with respect to the first measurement report 420. For example, the first measurement report 420 may include a measurement M1, and the second measurement report 440 may include a value (M1'−M1) corresponding to a difference between the measurement M1 and a measurement M1' that is based on DMRS1. As another example, the second measurement report 440 may include a value (M2'−M1) corresponding to a difference between the measurement M1 and a measurement M2' that is based on DMRS1. To further illustrate, the first measurement report 420 may include a measurement M2. The second measurement report 440 may include a value (M3'−M2) corresponding to a difference between the measurement M2 and a measurement M3' that is based on DMRS1. The second measurement report 440 may also include a value (M4'−M2) corresponding to a difference between the measurement M2 and a measurement M4' that is based on DMRS1.

FIGS. 5 and 6 also illustrate that transmissions may have multiple QCL relations. To illustrate, beam B1 of the first transmission 410 may have a first QCL relation with beams D1 and D2 of DMRS1 and with beams D5 and D6 of DMRS2. Further, the beam B2 of the first transmission 410 may have a second QCL relation with beams D3 and D4 of DMRS1 and with beams D7 and D8 of DMRS2. Thus, certain aspects described herein may be applicable to multiple QCL relations between transmissions.

To further illustrate, in some aspects of the disclosure, the second transmission 430 is performed via a first physical downlink shared channel (PDSCH) block, and the third transmission 550 is performed via a second PDSCH block. In some examples, the second transmission 430 and the third transmission 550 are performed using different sets of beams (e.g., to enable testing of the different sets of beams, in which case the base station 105 may select one of the sets of beams based on reception of the beams by the UE 115). The UE 115 may transmit the second measurement report 440 using a particular set of beams, and the base station 105 may adjust, based on the particular set of beams, from a first set beams used to perform the second transmission 430 to a second set of beams used to perform the third transmission 550. In some examples, DMRS1 and DMRS2 are transmitted using a same transmit beam. The UE 115 may adjust, based on the same transmit beam, a receive beam of the UE used to receive transmissions from the base station 105.

One or more aspects described herein may improve performance of a wireless communication system. For example, by using a differential format to report measurements, an amount of data transmitted via the wireless communication system 400 may be reduced, which may be particular advantageous in some low-overhead wireless communication protocols, such as a RedCap wireless communication protocol. To illustrate, in some wireless communication protocols, the measurement results 450, 460 may include a relatively large number of bits or digits and may change relatively infrequently (such as in the case of stationary sensors in a building, as an illustrative example). Further, in some cases, a DMRS (such as the DMRS 432) may serve multiple purposes in the wireless communication system 400, which may reduce a number of reference signals or a number of resources associated with reference signals in the wireless communication system. For example, in addition to using the DMRS 432 to estimate channel characteristics and demodulate signals received from the base station 105, the UE 115 may report measurements based on the DMRS 432 (using the second measurement report 440). As a result, one or more of a periodicity of the CSI-RS 414 or SSB 412 or a number of resources used to transmit the CSI-RS 414 or the SSB 412 may be reduced, increasing bandwidth or resources available for other communications, for other devices, or both.

FIG. 7 is a flow chart of a method 700 of wireless communication according to some aspects of the disclosure. In some examples, the method 700 is performed by a UE, such as the UE 115.

The method 700 includes receiving, by a UE, a first transmission, at 702. For example, the UE 115 may receive the first transmission 410 from the base station 105.

The method 700 further includes transmitting, by the UE, a first measurement report that is based on the first transmission and includes at least a first measurement result, at 704. For example, the UE 115 may transmit the first measurement report 420 based on the first transmission 410 and including at least the first measurement result 422.

The method 700 further includes receiving, by the UE, a second transmission that includes a DMRS, at 706. For example, the UE 115 may receive the second transmission 430 from the base station 105, and the second transmission 430 may include the DMRS 432.

The method 700 further includes transmitting, by the UE, a second measurement report that is based on the DMRS, at 708. The second measurement report includes at least a first value that is based on a difference between the first measurement result and a second measurement result that is based on the DMRS. For example, the UE 115 may transmit the second measurement report 440 based on the DMRS 432, and the second measurement report 440 may include the first value 442 that is based on the difference 424 between the first measurement result 422 and the second measurement result 462. The second measurement result 462 is based on the DMRS 432.

FIG. 8 is a flow chart of a method 800 of wireless communication according to some aspects of the disclosure. In some examples, the method 800 is performed by a base station, such as the base station 105.

The method 800 includes transmitting, by a base station, a first transmission, at 802. For example, the base station 105 may transmit the first transmission 410 to the UE 115.

The method 800 further includes receiving, by the base station, a first measurement report that is based on the first transmission and includes at least a first measurement result, at 804. For example, the base station 105 may receive the first measurement report 420 from the UE 115, and the first measurement report 420 may include the first measurement result 422.

The method 800 further includes transmitting, by the base station, a second transmission that includes a DMRS, at 806. For example, the base station 105 may transmit the second transmission 430 to the UE 115 including the DMRS 432.

The method 800 further includes receiving, by the base station, a second measurement report that is based on the DMRS, at 808. The second measurement report includes at least a first value that is based on a difference between the first measurement result and a second measurement result that is based on the DMRS. For example, the base station 105 may receive the second measurement report 440 from the UE 115 based on the DMRS 432, and the second measurement report 440 may include the first value 442 that is based on the difference 424 between the first measurement result 422 and the second measurement result 462. The second measurement result 462 is based on the DMRS 432.

Figure 9:
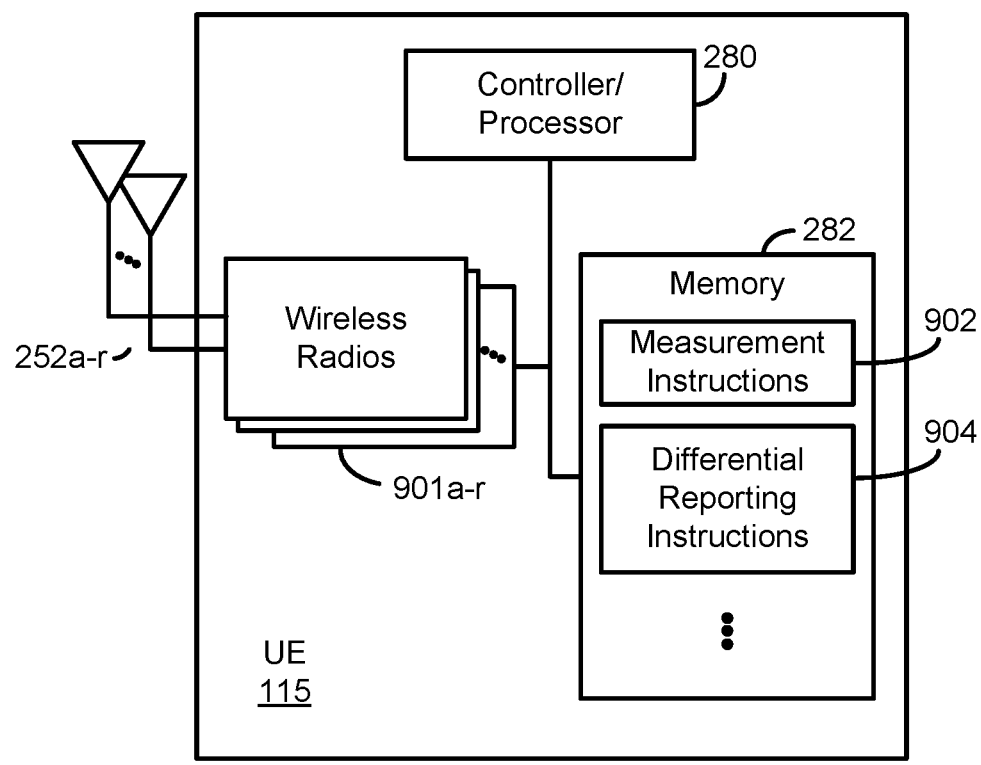
FIG. 9 is a block diagram illustrating an example of a UE according to some aspects of the disclosure.

FIG. 9 is a block diagram illustrating an example of a UE 115 according to some aspects of the disclosure. The UE 115 may include structure, hardware, or components illustrated in FIG. 2. For example, the UE 115 may include the controller/processor 280, which may execute instructions stored in the memory 282. Using the controller/processor 280, the UE 115 may transmit and receive signals via wireless radios 901a-r and antennas 252a-r. The wireless radios 901a-r may include one or more components or devices described herein, such as the modulator/demodulators 254a-r, the MIMO detector 256, the receive processor 258, the transmit processor 264, the TX MIMO processor 266, the transmitter 490, the receiver 492, one or more other components or devices, or a combination thereof.

The memory 282 may store instructions executable by the controller/processor 280 to initiate, perform, or control one or more operations described herein. For example, the memory 282 may store measurement instructions 902 executable by the controller/processor 280 to generate the first measurement results 450 based on the first transmission 410 and to generate the second measurement results 460 based on the second transmission 430. As another example, the memory 282 may store differential reporting instructions 904 executable by the controller/processor 280 to generate the second measurement report 440.

Figure 10:
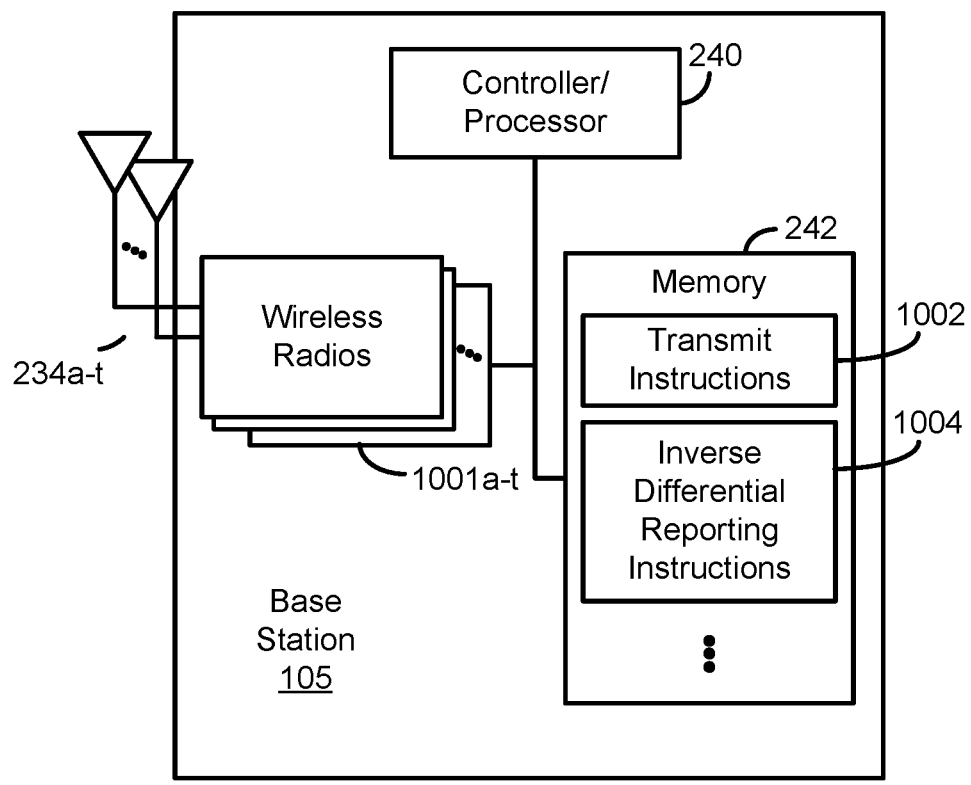
FIG. 10 is a block diagram illustrating an example of a base station according to some aspects of the disclosure.

FIG. 10 is a block diagram illustrating an example of a base station 105 according to some aspects of the disclosure. The base station 105 may include structure, hardware, and components illustrated in FIG. 2. For example, the base station 105 may include the controller/processor 240, which may execute instructions stored in memory 242. Under control of the controller/processor 240, the base station 105 may transmit and receive signals via wireless radios 1001a-t and antennas 234a-t. The wireless radios 1001a-t may include one or more components or devices described herein, such as the modulator/demodulators 232a-t, the MIMO detector 236, the receive processor 238, the transmit processor 220, the TX MIMO processor 230, the transmitter 480, the receiver 484, one or more other components or devices, or a combination thereof.

The memory 242 may store instructions executable by the controller/processor 240 to initiate, perform, or control one or more operations described herein. For example, the memory 242 may store transmit instructions 1002 executable by the controller/processor 240 to initiate, perform, or control one or more transmissions, such as to transmission of the one or more configuration messages 402, the first transmission 410, and the second transmission 430, as illustrative examples. As another example, the memory 242 may store inverse differential reporting instructions 1004 executable by the controller/processor 240 to determine a measurement result based on a differential value reported by the UE 115 and based on another value or measurement result. For example, in some implementations, after receiving the first measurement report 420 and the second measurement report 440, the controller/processor 240 may execute the inverse differential reporting instructions 1004 to determine the second measurement result 462 based on a sum of the first measurement result 422 and the first value 442.

According to some further aspects, in a first aspect, a method of wireless communication includes receiving, by a UE, a first transmission and transmitting, by the UE, a first measurement report that is based on the first transmission and includes at least a first measurement result. The method further includes receiving, by the UE, a second transmission that includes a DMRS and further includes transmitting, by the UE, a second measurement report that is based on the DMRS. The second measurement report includes at least a first value that is based on a difference between the first measurement result and a second measurement result that is based on the DMRS.

In a second aspect alternatively or in addition to the first aspect, the second measurement report further includes at least a second value that is based on a difference between the second measurement result and a third measurement result that is based on the DMRS.

In a third aspect alternatively or in addition to one or more of the first through second aspects, the second measurement report further includes at least a second value that is based on a difference between the first measurement result and a third measurement result that is based on the DMRS.

In a fourth aspect alternatively or in addition to one or more of the first through third aspects, the method includes receiving, by the UE, a message indicating that the first transmission and the second transmission are associated with a same spatial transmit filter.

In a fifth aspect alternatively or in addition to one or more of the first through fourth aspects, the second transmission has a QCL relation with the first transmission, and the message further indicates a type of the QCL relation.

In a sixth aspect alternatively or in addition to one or more of the first through fifth aspects, the method includes selecting a same spatial receiver filter based on the message, and the UE receives the first transmission and the second transmission using the same spatial filter.

In a seventh aspect alternatively or in addition to one or more of the first through sixth aspects, the method includes applying a compensation factor to one or more measurement results that are differential with respect to the first measurement report, where applying the compensation factor to the one or more measurement results includes applying the compensation factor to the second measurement result to determine an adjusted value and subtracting the adjusted value from the first measurement result to determine the first value.

In an eighth aspect alternatively or in addition to one or more of the first through seventh aspects, the compensation factor is selected to account for one or more of a change in beam pattern from the first transmission to the second transmission, a difference in precoding between the first transmission and the second transmission, a change in channel condition from the first transmission to the second transmission, or a change in scheduled bandwidth from the first transmission to the second transmission.

In a ninth aspect alternatively or in addition to one or more of the first through eighth aspects, the method includes receiving, by the UE, a message indicating the compensation factor.

In a tenth aspect alternatively or in addition to one or more of the first through ninth aspects, the message requests that the UE provide the second measurement report based on a differential format irrespective of whether the first transmission has a QCL relation with the second transmission and irrespective of whether the first transmission and the second transmission are associated with a same spatial transmit filter.

In an eleventh aspect alternatively or in addition to one or more of the first through tenth aspects, the method includes determining, by the UE, that a change in a particular measurement result associated with the second measurement report relative to a corresponding measurement result of the first measurement report fails to satisfy a threshold difference, and the second measurement report excludes a value associated with the particular measurement result indicating that the change fails to satisfy the threshold difference.

In a twelfth aspect alternatively or in addition to one or more of the first through eleventh aspects, the change is quantized to within a particular number of significant values associated with the first measurement report and the second measurement report.

In a thirteenth aspect alternatively or in addition to one or more of the first through twelfth aspects, the first transmission is associated with a single antenna port, the second transmission is associated with multiple antenna ports, and the second measurement result is determined based on an average of measurements determined over the multiple antenna ports.

In a fourteenth aspect alternatively or in addition to one or more of the first through thirteenth aspects, the first transmission is associated with a first group of antenna ports, the second transmission is associated with a second group of antenna ports, the first measurement result is determined based on a first average of measurements determined over the first group of antenna ports, and the second measurement result is determined based on a second average of measurements determined over the second group of antenna ports.

In a fifteenth aspect alternatively or in addition to one or more of the first through fourteenth aspects, receiving, by the UE, a message changing a format of DMRS-based measurement reports transmitted by the UE.

In a sixteenth aspect alternatively or in addition to one or more of the first through fifteenth aspects, the message indicates that the DMRS-based measurement reports are to be differential with respect to a third transmission instead of with respect to the first transmission.

In a seventeenth aspect alternatively or in addition to one or more of the first through sixteenth aspects, the message indicates that the DMRS-based measurement reports are to include absolute values instead of differential values.

In an eighteenth aspect alternatively or in addition to one or more of the first through seventeenth aspects, an apparatus for wireless communication includes a receiver configured to receive a first transmission and to receive a second transmission that includes a DMRS. The apparatus further includes a transmitter configured to transmit a first measurement report that is based on the first transmission and that includes at least a first measurement result and to transmit a second measurement report that is based on the DMRS. The second measurement report includes at least a first value that is based on a difference between the first measurement result and a second measurement result that is based on the DMRS.

In a nineteenth aspect alternatively or in addition to one or more of the first through eighteenth aspects, the second measurement report further includes at least a second value, and further comprising a processor configured to determine the second value based on a difference between the second measurement result and a third measurement result that is based on the DMRS.

In a twentieth aspect alternatively or in addition to one or more of the first through nineteenth aspects, the second measurement report further includes at least a second value, and further comprising a processor configured to determine the second value based on a difference between the first measurement result and a third measurement result that is based on the DMRS.

In a twenty-first aspect alternatively or in addition to one or more of the first through twentieth aspects, a method of wireless communication includes transmitting, by a base station, a first transmission and receiving, by the base station, a first measurement report that is based on the first transmission and includes at least a first measurement result. The method further includes transmitting, by the base station, a second transmission that includes a DMRS and receiving, by the base station, a second measurement report that is based on the DMRS. The second measurement report includes at least a first value that is based on a difference between the first measurement result and a second measurement result that is based on the DMRS.

In a twenty-second aspect alternatively or in addition to one or more of the first through twenty-first aspects, the second measurement report further includes at least a second value that is based on a difference between the second measurement result and a third measurement result that is based on the DMRS.

In a twenty-third aspect alternatively or in addition to one or more of the first through twenty-second aspects, the second measurement report further includes at least a second value that is based on a difference between the first measurement result and a third measurement result that is based on the DMRS.

In a twenty-fourth aspect alternatively or in addition to one or more of the first through twenty-third aspects, transmitting a message indicating that the first transmission and the second transmission are associated with a same spatial transmit filter.

In a twenty-fifth aspect alternatively or in addition to one or more of the first through twenty-fourth aspects, the second transmission has a QCL relation with the first transmission, and the message further indicates a type of the QCL relation.

In a twenty-sixth aspect alternatively or in addition to one or more of the first through twenty-fifth aspects, the method includes transmitting a message indicating a compensation factor that is selected to account for one or more of a change in beam pattern from the first transmission to the second transmission, a difference in precoding between the first transmission and the second transmission, a change in channel condition from the first transmission to the second transmission, or a change in scheduled bandwidth from the first transmission to the second transmission.

In a twenty-seventh aspect alternatively or in addition to one or more of the first through twenty-sixth aspects, the method includes transmitting a message changing a format of DMRS-based measurement reports.

In a twenty-eighth aspect alternatively or in addition to one or more of the first through twenty-seventh aspects, an apparatus for wireless communication includes a transmitter configured to transmit a first transmission and to transmit a second transmission that includes a DMRS. The apparatus further includes a receiver configured to receive a first measurement report that is based on the first transmission and includes at least a first measurement result and to receive a second measurement report that is based on the DMRS. The second measurement report includes at least a first value that is based on a difference between the first measurement result and a second measurement result that is based on the DMRS.

In a twenty-ninth aspect alternatively or in addition to one or more of the first through twenty-eighth aspects, the second measurement report further includes at least a second value that is based on a difference between the second measurement result and a third measurement result that is based on the DMRS.

In a thirtieth aspect alternatively or in addition to one or more of the first through twenty-ninth aspects, the second measurement report further includes at least a second value that is based on a difference between the first measurement result and a third measurement result that is based on the DMRS.

In a thirty-first aspect alternatively or in addition to one or more of the first through thirtieth aspects, a non-transitory computer-readable medium stores instructions executable by a processor to initiate, perform, or control operations. The operations include receiving, by a UE, a first transmission and transmitting, by the UE, a first measurement report that is based on the first transmission and includes at least a first measurement result. The operations further include receiving, by the UE, a second transmission that includes a DMRS and further includes transmitting, by the UE, a second measurement report that is based on the DMRS. The second measurement report includes at least a first value that is based on a difference between the first measurement result and a second measurement result that is based on the DMRS.

In a thirty-second aspect alternatively or in addition to one or more of the first through thirty-first aspects, an apparatus for wireless communication includes means for receiving a first transmission and for receiving a second transmission that includes a DMRS. The apparatus further includes means for transmitting a first measurement report that is based on the first transmission and that includes at least a first measurement result and for transmitting a second measurement report that is based on the DMRS. The second measurement report includes at least a first value that is based on a difference between the first measurement result and a second measurement result that is based on the DMRS.

In a thirty-third aspect alternatively or in addition to one or more of the first through thirty-second aspects, a non-transitory computer-readable medium stores instructions executable by a processor to initiate, perform, or control operations. The operations include transmitting, by a base station, a first transmission and receiving, by the base station, a first measurement report that is based on the first transmission and includes at least a first measurement result. The operations further include transmitting, by the base station, a second transmission that includes a DMRS and receiving, by the base station, a second measurement report that is based on the DMRS. The second measurement report includes at least a first value that is based on a difference between the first measurement result and a second measurement result that is based on the DMRS.

In a thirty-fourth aspect alternatively or in addition to one or more of the first through thirty-third aspects, an apparatus for wireless communication includes a transmitter configured to transmit a first transmission and to transmit a second transmission that includes a DMRS. The apparatus further includes a receiver configured to receive a first measurement report that is based on the first transmission and includes at least a first measurement result and to receive a second measurement report that is based on the DMRS. The second measurement report includes at least a first value that is based on a difference between the first measurement result and a second measurement result that is based on the DMRS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and devices described herein (e.g., one or more components, functional blocks, and devices of FIG. 2) may include one or more processors, electronics devices, hardware devices, electronics components, logical circuits, memories, software codes, firmware codes, etc., or any combination thereof. Those of skill would further appreciate that the various illustrative logical blocks, devices, circuits, and operations described herein may be implemented using electronic hardware, computer software, or combinations of both. To illustrate, various components, blocks, devices, circuits, and steps have been described above generally in terms of their functionality. Whether such functionality is implemented as hardware or software depends upon the particular application and design parameters of the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
  receiving, by a user equipment (UE), a first transmission;
  transmitting, by the UE, a first measurement report that is based on the first transmission and includes at least a first measurement result;
  receiving, by the UE, a second transmission, wherein the second transmission includes a demodulation reference signal (DMRS);
  transmitting, by the UE, a second measurement report that is based on the DMRS, wherein the second measurement report includes at least a first value that is based on a difference between the first measurement result and a second measurement result that is based on the DMRS; and
  receiving, by the UE, a message indicating a change of a format of DMRS-based measurement reports transmitted by the UE.

2. The method of claim 1, wherein the second measurement report further includes at least a second value that is based on a difference between the second measurement result and a third measurement result that is based on the DMRS.

3. The method of claim 1, wherein the second measurement report further includes at least a second value that is based on a difference between the first measurement result and a third measurement result that is based on the DMRS.

4. The method of claim 1, further comprising receiving, by the UE, a message indicating that the first transmission and the second transmission are associated with a same spatial transmit filter.

5. The method of claim 4, wherein the second transmission has a quasi-colocation (QCL) relation with the first transmission, and wherein the message further indicates a type of the QCL relation.

6. The method of claim 5, further comprising selecting a same spatial receiver filter based on the message, wherein the UE receives the first transmission and the second transmission using the same spatial filter.

7. The method of claim 1, further comprising applying a compensation factor to one or more measurement results that are differential with respect to the first measurement report, wherein applying the compensation factor to the one or more measurement results includes:
  applying the compensation factor to the second measurement result to determine an adjusted value; and
  subtracting the adjusted value from the first measurement result to determine the first value.

8. The method of claim 7, wherein the compensation factor is selected to account for one or more of a change in beam pattern from the first transmission to the second transmission, a difference in precoding between the first transmission and the second transmission, a change in channel condition from the first transmission to the second transmission, or a change in scheduled bandwidth from the first transmission to the second transmission.

9. The method of claim 7, further comprising receiving, by the UE, a message indicating the compensation factor.

10. The method of claim 9, wherein the message requests that the UE provide the second measurement report based on a differential format irrespective of whether the first transmission has a quasi-colocation (QCL) relation with the second transmission and irrespective of whether the first transmission and the second transmission are associated with a same spatial transmit filter.

11. The method of claim 1, further comprising determining, by the UE, that a change in a particular measurement result associated with the second measurement report relative to a corresponding measurement result of the first measurement report fails to satisfy a threshold difference, and wherein the second measurement report excludes a value associated with the particular measurement result indicating that the change fails to satisfy the threshold difference.

12. The method of claim 11, wherein the change is quantized to within a particular number of significant values associated with the first measurement report and the second measurement report.

13. The method of claim 1, wherein the first transmission is associated with a single antenna port, wherein the second transmission is associated with multiple antenna ports, and wherein the second measurement result is determined based on an average of measurements determined over the multiple antenna ports.

14. The method of claim 1, wherein the first transmission is associated with a first group of antenna ports, wherein the second transmission is associated with a second group of antenna ports, wherein the first measurement result is determined based on a first average of measurements determined over the first group of antenna ports, and wherein the second measurement result is determined based on a second average of measurements determined over the second group of antenna ports.

15. The method of claim 1, wherein the message indicates that the DMRS-based measurement reports are to be differential with respect to a third transmission instead of with respect to the first transmission.

16. The method of claim 1, wherein the message indicates that the DMRS-based measurement reports are to include absolute values instead of differential values.

17. An apparatus for wireless communication, comprising:
- a receiver configured to receive a first transmission and to receive a second transmission that includes a demodulation reference signal (DMRS); and
- a transmitter configured to transmit a first measurement report that is based on the first transmission and that includes at least a first measurement result and to transmit a second measurement report that is based on the DMRS,
- wherein the second measurement report includes at least a first value that is based on a difference between the first measurement result and a second measurement result that is based on the DMRS, and
- wherein the receiver is further configured to receive a message indicating a change of a format of DMRS-based measurement reports.

18. The apparatus of claim 17, wherein the second measurement report further includes at least a second value, and further comprising a processor configured to determine the second value based on a difference between the second measurement result and a third measurement result that is based on the DMRS.

19. The apparatus of claim 17, wherein the second measurement report further includes at least a second value, and further comprising a processor configured to determine the second value based on a difference between the first measurement result and a third measurement result that is based on the DMRS.

20. A method of wireless communication, comprising:
- transmitting, by a base station, a first transmission;
- receiving, by the base station, a first measurement report that is based on the first transmission and includes at least a first measurement result;
- transmitting, by the base station, a second transmission, wherein the second transmission includes a demodulation reference signal (DMRS);
- receiving, by the base station, a second measurement report that is based on the DMRS, wherein the second measurement report includes at least a first value that is based on a difference between the first measurement result and a second measurement result that is based on the DMRS; and
- transmitting a message indicating a change of format of DMRS-based measurement reports.

21. The method of claim 20, wherein the second measurement report further includes at least a second value that is based on a difference between the second measurement result and a third measurement result that is based on the DMRS.

22. The method of claim 20, wherein the second measurement report further includes at least a second value that is based on a difference between the first measurement result and a third measurement result that is based on the DMRS.

23. The method of claim 20, further comprising transmitting a message indicating that the first transmission and the second transmission are associated with a same spatial transmit filter.

24. The method of claim 23, wherein the second transmission has a quasi-colocation (QCL) relation with the first transmission, and wherein the message further indicates a type of the QCL relation.

25. The method of claim 20, further comprising transmitting a message indicating a compensation factor that is selected to account for one or more of a change in beam pattern from the first transmission to the second transmission, a difference in precoding between the first transmission and the second transmission, a change in channel condition from the first transmission to the second transmission, or a change in scheduled bandwidth from the first transmission to the second transmission.

26. An apparatus for wireless communication, comprising:
- a transmitter configured to transmit a first transmission and to transmit a second transmission that includes a demodulation reference signal (DMRS); and
- a receiver configured to receive a first measurement report that is based on the first transmission and includes at least a first measurement result and to receive a second measurement report that is based on the DMRS,
- wherein the second measurement report includes at least a first value that is based on a difference between the first measurement result and a second measurement result that is based on the DMRS, and
- wherein the transmitter is further configured to transmit a message indicating a change of a format of DMRS-based measurement reports.

27. The apparatus of claim 26, wherein the second measurement report further includes at least a second value that is based on a difference between the second measurement result and a third measurement result that is based on the DMRS.

28. The apparatus of claim 26, wherein the second measurement report further includes at least a second value that is based on a difference between the first measurement result and a third measurement result that is based on the DMRS.

29. The apparatus of claim 17, wherein the message indicates that the DMRS-based measurement reports are to be differential with respect to a third transmission instead of with respect to the first transmission.

30. The apparatus of claim 17, wherein the message indicates that the DMRS-based measurement reports are to include absolute values instead of differential values.

* * * * *